US012159614B2

(12) United States Patent
Wang et al.

(10) Patent No.: US 12,159,614 B2
(45) Date of Patent: Dec. 3, 2024

(54) ACTIVE NOISE REDUCTION SYSTEM, ACTIVE NOISE REDUCTION METHOD, AND NON-TRANSITORY COMPUTER-READABLE STORAGE MEDIUM

(71) Applicant: HONDA MOTOR CO., LTD., Tokyo (JP)

(72) Inventors: Xun Wang, Saitama (JP); Toshio Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 18/188,125

(22) Filed: Mar. 22, 2023

(65) Prior Publication Data

US 2023/0306948 A1 Sep. 28, 2023

(30) Foreign Application Priority Data

Mar. 28, 2022 (JP) ................................ 2022-051502

(51) Int. Cl.
*G10K 11/178* (2006.01)

(52) U.S. Cl.
CPC .... *G10K 11/1783* (2018.01); *G10K 11/17823* (2018.01); *G10K 11/17825* (2018.01); *G10K 11/17881* (2018.01); *G10K 11/17883* (2018.01); *G10K 11/17815* (2018.01); *G10K 2210/12821* (2013.01); *G10K 2210/3016* (2013.01); *G10K 2210/3018* (2013.01); *G10K 2210/3026* (2013.01); *G10K 2210/3027* (2013.01); *G10K 2210/3036* (2013.01); *G10K 2210/3044* (2013.01); *G10K 2210/3055* (2013.01)

(58) Field of Classification Search
CPC ..... G10K 2210/503; G10K 2210/3055; G10K 2210/3044; G10K 2210/3036; G10K 2210/3018; G10K 2210/3016; G10K 2210/3012; G10K 11/17833; G10K 11/17854; G10K 11/1783; G10K 11/17825; G10K 11/17817; G10K 11/17815

See application file for complete search history.

(56) References Cited

U.S. PATENT DOCUMENTS 9,997,151 B1 * 6/2018 Ayrapetian ........... G10K 11/178

FOREIGN PATENT DOCUMENTS

WO 2021201016 A1 10/2021

* cited by examiner

*Primary Examiner* — Kile O Blair
(74) *Attorney, Agent, or Firm* — Armstrong Teasdale LLP

(57) ABSTRACT

An active noise reduction system includes a canceling sound output device configured to output a canceling sound for canceling a noise, a noise signal generator configured to generate noise signals based on the noise, and a controller configured to control the canceling sound output device based on the noise signals, wherein the controller is configured to acquire buffer data in which the noise signals are stored in a time series, generate a plurality of divided data by dividing the buffer data, calculate a correlation value of the buffer data based on the plurality of divided data, detect presence/absence of disturbance mixed in the buffer data based on the correlation value, and switch control over the canceling sound output device according to the presence/absence of the disturbance mixed in the buffer data.

9 Claims, 15 Drawing Sheets

ACTIVE NOISE REDUCTION SYSTEM, ACTIVE NOISE REDUCTION METHOD, AND NON-TRANSITORY COMPUTER-READABLE STORAGE MEDIUM

TECHNICAL FIELD

The present invention relates to an active noise reduction system, an active noise reduction method, and a non-transitory computer-readable storage medium that reduce a noise by causing a canceling sound in an opposite phase to the noise to interfere with the noise.

BACKGROUND ART

Conventionally, an active noise reduction system reduces a noise by causing a canceling sound in an opposite phase to the noise to interfere with the noise.

For example, WO2021/201016A1 discloses an active noise reduction system (a portable terminal) including a speaker that outputs a canceling sound, a microphone that detects a canceling error sound synthesized from the canceling sound and a noise, and a controller that controls the speaker based on the canceling error sound.

In a case where the abovementioned active noise reduction system is applied to a vehicle, disturbance may be mixed into the canceling error sound when the wind from an air conditioner blows against the microphone or when the wind coming from an outside through an opened window blows against the microphone. If the speaker is controlled based on the canceling error sound in which the disturbance is mixed, an abnormal sound may be generated as a control value of the speaker diverges or a canceling sound different from an original canceling sound is generated.

SUMMARY OF THE INVENTION

In view of the above background, an object of the present invention is to provide an active noise reduction system, an active noise reduction method, and a non-transitory computer-readable storage medium that can prevent the generation of an abnormal sound due to disturbance.

To achieve such an object, one aspect of the present invention provides an active noise reduction system (11) comprising: a canceling sound output device (13) configured to output a canceling sound for canceling a noise; a noise signal generator (12, 14) configured to generate noise signals based on the noise; and a controller (16) configured to control the canceling sound output device based on the noise signals, wherein the controller is configured to: acquire buffer data in which the noise signals are stored in a time series (step ST1); generate a plurality of divided data by dividing the buffer data (step ST2); calculate a correlation value of the buffer data based on the plurality of divided data (step ST3); detect presence/absence of disturbance mixed in the buffer data based on the correlation value (steps ST5, ST7); and switch control over the canceling sound output device according to the presence/absence of the disturbance mixed in the buffer data (steps ST8, ST9).

According to this aspect, the presence/absence of the disturbance mixed in the buffer data is detected based on the correlation value, so that the control over the canceling sound output device can be appropriately switched according to the presence/absence of the disturbance. Accordingly, it is possible to suppress the generation of an abnormal sound due to the disturbance.

In the above aspect, preferably, the canceling sound output device and the noise signal generator are installed in a vehicle (1), the vehicle includes a vehicle information acquisition device (15, 37) configured to acquire prescribed vehicle information, and the controller is configured to detect the presence/absence of the disturbance mixed in the buffer data based on the correlation value and the vehicle information.

According to this aspect, by detecting the presence/absence of the disturbance based on both the correlation value and the vehicle information, the detection accuracy of the presence/absence of the disturbance can be improved.

In the above aspect, preferably, the vehicle information acquisition device is an air conditioner (15) configured to condition air inside a vehicle cabin (2), and the air conditioner includes a blower (15*a*) configured to blow a wind into the vehicle cabin, and is configured to acquire a voltage of the blower as the vehicle information.

According to this aspect, the presence/absence of the disturbance caused by the wind from the air conditioner can be detected with high accuracy.

In the above aspect, preferably, the vehicle information acquisition device is a window opening/closing device (37) configured to open and close a window (38) of the vehicle, and the window opening/closing device is configured to acquire information on opening/closing of the window as the vehicle information.

According to this aspect, the presence/absence of the disturbance caused by the wind from outside the vehicle can be detected with high accuracy.

In the above aspect, preferably, the controller is configured to calculate a high frequency component of the buffer data and detect the presence/absence of the disturbance mixed in the buffer data based on the correlation value and the high frequency component.

According to this aspect, even if the vehicle information cannot be acquired, the detection accuracy of the presence/absence of the disturbance can be improved.

In the above aspect, preferably, upon detecting the absence of the disturbance mixed in the buffer data, the controller causes the canceling sound output device to continue outputting the canceling sound (step ST8), and upon detecting the presence of the disturbance mixed in the buffer data, the controller causes the canceling sound output device to stop outputting the canceling sound (step ST9).

According to this aspect, when the disturbance is mixed in the buffer data, it is possible to suppress the output of the canceling sound based on the buffer data in which the disturbance is mixed. Thus, the generation of the abnormal sound can be suppressed more effectively.

In the above aspect, preferably, the canceling sound output device and the noise signal generator are installed in a vehicle, and the controller is installed in a portable terminal (18) configured to be taken outside the vehicle.

According to this aspect, processing by the controller can be realized by an application installed on the portable terminal (for example, a smart phone).

To achieve the abovementioned object, one aspect of the present invention provides an active noise reduction method comprising: acquiring buffer data in which noise signals generated based on a noise are stored in a time series (step ST1); generating a plurality of divided data by dividing the buffer data (step ST2); calculating a correlation value of the buffer data based on the plurality of divided data (step ST3); detecting presence/absence of disturbance mixed in the buffer data based on the correlation value (steps ST5, ST7);

and switching control over a canceling sound according to the presence/absence of the disturbance mixed in the buffer data (steps ST8, ST9).

To achieve the abovementioned object, one aspect of the present invention provides a non-transitory computer-readable storage medium (16*b*) comprising an active noise reduction program, wherein the active noise reduction program, when executed by a processor (16*a*), executes an active noise reduction method, comprising: acquiring buffer data in which noise signals generated based on a noise are stored in a time series (step ST1); generating a plurality of divided data by dividing the buffer data (step ST2); calculating a correlation value of the buffer data based on the plurality of divided data (step ST3); detecting presence/absence of disturbance mixed in the buffer data based on the correlation value (steps ST5, ST7); and switching control over a canceling sound according to the presence/absence of the disturbance mixed in the buffer data (steps ST8, ST9).

According to this aspect, the presence/absence of the disturbance mixed in the buffer data is detected based on the correlation value, so that the control over the canceling sound can be appropriately switched according to the presence/absence of the disturbance. Accordingly, it is possible to suppress the generation of an abnormal sound due to the disturbance.

Thus, according to the above aspects, it is possible to provide an active noise reduction system, an active noise reduction method, and a non-transitory computer-readable storage medium that can prevent the generation of an abnormal sound due to disturbance.

BRIEF DESCRIPTION OF THE DRAWING(S)

DETAILED DESCRIPTION OF THE INVENTION

Figure 1:
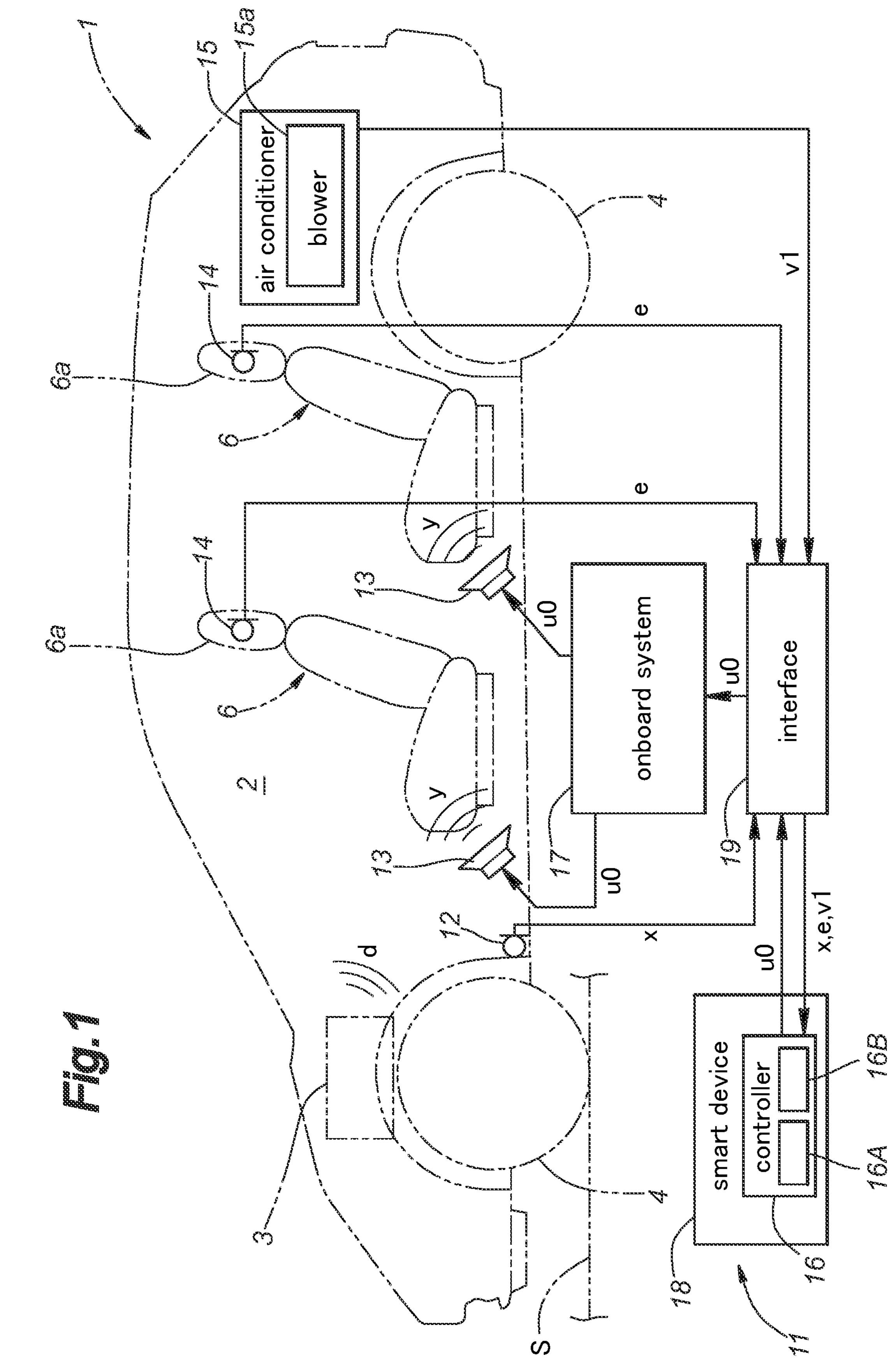
FIG. 1 is a schematic diagram showing a vehicle to which an active noise reduction system according to the first embodiment is applied.

In the following, embodiments of the present invention will be described with reference to the drawings. In this specification, "^" (circumflexes) shown together with symbols each indicate an identification value or an estimation value. "^" are shown above the symbols in the drawings and formulas, but are shown subsequently to the symbols in the text of the description.

The First Embodiment

First, the first embodiment of the present invention will be described with reference to FIGS. 1 to 8.

<The Active Noise Reduction System 11>

FIG. 1 is a schematic diagram showing a vehicle 1 to which an active noise reduction system 11 (hereinafter abbreviated as "noise reduction system 11") according to the first embodiment is applied. The noise reduction system 11 is an active noise control device (ANC device) for reducing a noise d generated in a vehicle cabin 2 of the vehicle 1. More specifically, the noise reduction system 11 reduces the noise d by generating a canceling sound y in an opposite phase to the noise d and causing the generated canceling sound y to interfere with the noise d.

For example, the noise d to be reduced by the noise reduction system 11 is a driving noise caused by the vibration of a driving source 3 such as an internal combustion engine or an electric motor. Alternatively, the noise d to be reduced by the noise reduction system 11 may be a noise other than the driving noise described above (for example, a road noise caused by the vibration of wheels 4 due to the force received from a road surface S).

Figure 2:
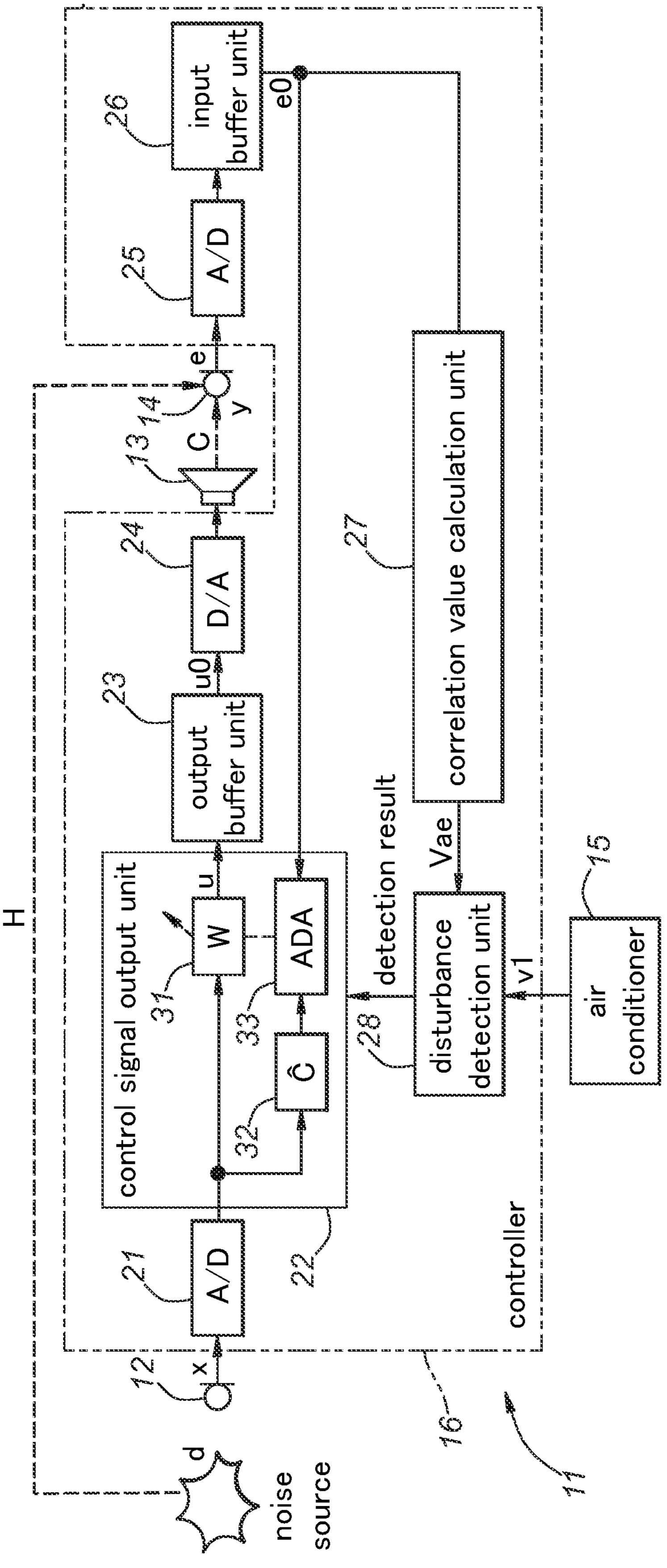
FIG. 2 is a functional block diagram showing the active noise reduction system according to the first embodiment.

With reference to FIGS. 1 and 2, the noise reduction system 11 includes a reference microphone 12 (an example of a noise signal generator) configured to generate reference signals x (an example of noise signals) corresponding to the noise d, a plurality of speakers 13 (an example of a canceling sound output device) configured to output a canceling sound y for canceling the noise d, a plurality of error microphones 14 (an example of a noise signal generator) configured to detect an error (synthetic sound) between the noise d and the canceling sound y and generate error signals e (an example of noise signals) corresponding to the detected error, an air conditioner 15 (an example of a vehicle information acquisition device) configured to acquire a blower voltage v1 (an example of vehicle information), and a controller 16 configured to control the plurality of speakers 13 based on the reference signals x, the error signals e, and the blower voltage v1.

A symbol H in FIG. 2 represents transfer characteristics of the noise d (transfer characteristics of a primary path) from a noise source (for example, the driving source 3) to each error microphone 14. 2 A symbol C in FIG. 2 represents transfer characteristics of the canceling sound y (transfer characteristics of a secondary path) from each speaker 13 to the corresponding error microphone 14. A symbol "ADA" in FIG. 2 indicates "adaptive".

<The Reference Microphone 12>

With reference to FIGS. 1 and 2, the reference microphone 12 of the noise reduction system 11 is installed in any location of the vehicle 1 (for example, installed near the noise source). The reference microphone 12 detects a sound generated by the noise source and generates the reference signals x according to the detected sound. In another embodiment, the reference signals x may be generated by a vibration sensor that detects the vibration generated by the noise source.

<The Speakers 13>

With reference to FIG. 1, each speaker 13 of the noise reduction system 11 is installed in a door of the vehicle 1. In another embodiment, the speaker 13 may be installed in a location other than the door of the vehicle 1 (for example, the speaker 13 may be installed in a headrest 6*a* of an occupant seat 6 or on a floor below the occupant seat 6).

Each speaker 13 of the noise reduction system 11 is connected to an onboard system 17 mounted on the vehicle 1. The onboard system 17 includes a processing device, a display device, and an input device. The processing device consists of a computer including an arithmetic processing device (a processor such as CPU, MPU, or the like) and a storage device (memory such as ROM, RAM, or the like). The display device consists of, for example, a liquid crystal display or an organic EL display. The input device consists of, for example, a touch panel. In FIG. 2, the onboard system 17 is omitted.

<The Error Microphones 14>

Each error microphone 14 of the noise reduction system 11 is installed, for example, in the headrest 6*a* of the occupant seat 6. In another embodiment, the error microphone 14 may be installed in a location other than the occupant seat 6 of the vehicle 1 (for example, the error microphone 14 may be installed on a ceiling above the occupant seat 6).

<The Air Conditioner 15>

The air conditioner 15 of the noise reduction system 11 is a device that conditions air inside the vehicle cabin 2. The air conditioner 15 includes a blower 15*a* that blows a wind into the vehicle cabin 2. The air conditioner 15 acquires a voltage of the blower 15*a* as the blower voltage v1.

<The Controller 16>

With reference to FIG. 1, the controller 16 of the noise reduction system 11 consists of a computer including a processing device 16*a* (a processor such as CPU, MPU, or the like) and a storage device 16*b* (memory such as ROM, RAM, or the like). The processing device 16*a* is an example of a processor, and the storage device 16*b* is an example of a non-transitory computer-readable storage medium. The controller 16 may consist of one piece of hardware, or may consist of a unit composed of plural pieces of hardware.

The controller 16 is provided in a smart device 18 (an example of a portable terminal) configured to be taken outside the vehicle 1. More specifically, the controller 16 is realized by an active noise reduction program (active noise reduction application) executed on an OS of the smart device 18. The smart device 18 consists of a smart phone, for example.

The controller 16 is connected to an interface 19 provided in the vehicle 1, and is connected to the reference microphone 12, each error microphone 14, the air conditioner 15, and the onboard system 17 via the interface 19. The interface 19 may be a wired interface such as USB, or a wireless interface such as Bluetooth™. In FIG. 2, the interface 19 is omitted.

With reference to FIG. 2, the controller 16 includes, as functional components, a first A/D conversion unit 21, a control signal output unit 22, an output buffer unit 23, a D/A conversion unit 24, a second A/D conversion unit 25, an input buffer unit 26, a correlation value calculation unit 27, and a disturbance detection unit 28.

<The First A/D Conversion Unit 21>

The first A/D conversion unit 21 of the controller 16 converts analog reference signals x output from the reference microphone 12 into digital reference signals x, and outputs the digital reference signals x to the control signal output unit 22. Hereinafter, "reference signals x" without explanation indicate the reference signals x that have passed through the first A/D conversion unit 21.

<The Control Signal Output Unit 22>

The control signal output unit 22 of the controller 16 includes a control filter unit 31, a secondary path filter unit 32, and a control update unit 33.

The control filter unit 31 consists of a control filter W. A finite impulse response filter (FIR filter) or a single-frequency adaptive notch filter (SAN filter) may be used for the control filter W. The control filter unit 31 generates control signals u by filtering the reference signals x, and outputs the generated control signals u to the output buffer unit 23.

The secondary path filter unit 32 consists of a secondary path filter C^. The secondary path filter C^ is a filter corresponding to an estimation value of the transfer characteristics C of the canceling sound y from the speaker 13 to the error microphone 14. An FIR filter or a SAN filter may be used for the secondary path filter C^. The secondary path filter unit 32 filters the reference signals x and outputs the filtered reference signals x to the control update unit 33.

The control update unit 33 adaptively updates the control filter W using an adaptive algorithm such as a Least Mean Square algorithm (LMS algorithm). More specifically, the control update unit 33 updates the control filter W such that the error signals e included in error buffer data e0 (that will be described later) is minimized.

<The Output Buffer Unit 23>

The output buffer unit 23 of the controller 16 generates control buffer data u0 in which a plurality of control signals u are stored in a time series by buffering the control signals u output from the control signal output unit 22 in a time series. The output buffer unit 23 outputs the generated control buffer data u0 to the D/A conversion unit 24.

<The D/A Conversion Unit 24>

The D/A conversion unit 24 of the controller 16 converts digital control signals u included in the control buffer data u0 into analog control signals u, and outputs the analog control signals u to the speaker 13. Thus, the speaker 13 generates the canceling sound y according to the control signals u.

<The Second A/D Conversion Unit 25>

The second A/D conversion unit 25 of the controller 16 converts analog error signals e output from each error microphone 14 into digital error signals e, and outputs the digital error signals e to the input buffer unit 26. Hereinafter, "error signals e" without explanation indicate the error signals e that have passed through the second A/D conversion unit 25.

<The Input Buffer Unit 26>

The input buffer unit 26 of the controller 16 buffers the error signals e, and thus generates the error buffer data e0 in which N ($N \geq 2$) pieces of error signals e (e (1), e (2), . . . , e (n), . . . , e (N)) are stored in a time series. The input buffer unit 26 outputs the generated error buffer data e0 to the control signal output unit 22 and the correlation value calculation unit 27.

<The Correlation Value Calculation Unit 27>

The correlation value calculation unit 27 of the controller 16 calculates an autocorrelation value Vae of the error buffer data e0 based on the error buffer data e0 output from the input buffer unit 26. The correlation value calculation unit 27 outputs the calculated autocorrelation value Vae to the disturbance detection unit 28. Hereinafter, a method of calculating the autocorrelation value Vae by the correlation value calculation unit 27 will be described.

Figure 3:
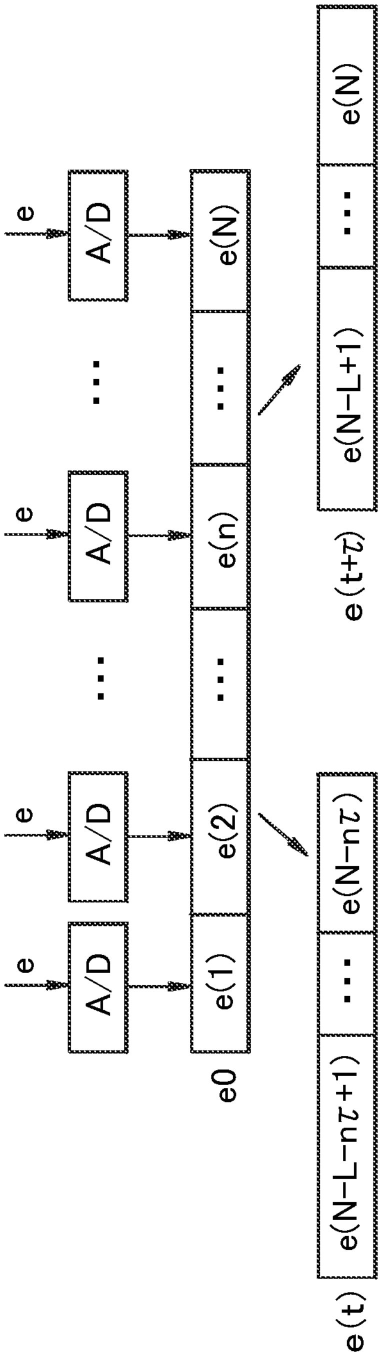
FIG. 3 is an explanatory diagram showing a method of generating first and second divided data according to the first embodiment.

With reference to FIG. 3, first, the correlation value calculation unit 27 generates a first divided data e (t) and a second divided data e (t+τ) having a prescribed time difference τ by dividing the error buffer data e0 output from the input buffer unit 26.

The first divided data e (t) includes L pieces of error signals e from an error signal e (N–L–nτ+1) to an error signal e (N–nτ). The second divided data e (t+τ) includes L pieces of error signals e from an error signal e (N–L+1) to an error signal e (N). The number L of the error signals e included in each of the first divided data e (t) and the second divided data e (t+τ) corresponds to the number of error signals e required to calculate the autocorrelation value Vae of the error buffer data e0.

The first error signal e (N–L–nτ+1) of the first divided data e (t) goes ahead of the first error signal e (N–L+1) of the second divided data e (t+τ) by nτ. Similarly, the second to L-th error signals e of the first divided data e (t) go ahead of the second to L-th error signals e of the second divided data e (t+τ) by nτ, respectively. The difference nτ between each error signal e included in the first divided data e (t) and the corresponding error signal e included in the second divided data e (t+τ) corresponds to the time difference τ between the first divided data e (t) and the second divided data e (t+τ).

The above number L and difference nτ are set such that the following formula (1) is satisfied. Accordingly, the correlation value calculation unit 27 can generate the first divided data e (t) and the second divided data e (t+τ) from one error buffer data e0.

$$N-L-n\tau+1\geq 1 \tag{1}$$

In another embodiment, the correlation value calculation unit 27 may generate a connected buffer data by connecting M (M≥2) pieces of error buffer data e0, and generate the first divided data e (t) and the second divided data e (t+τ) by dividing the connected buffer data. Accordingly, the number of error signals e included in the buffer data, which are the source of the first divided data e (t) and the second divided data e (t+τ), can be increased from N to N×M. Accordingly, when it is desirable that the calculation accuracy of the autocorrelation value Vae (disturbance detection accuracy) be improved in a low frequency band, the number L can be set large.

Figure 4:
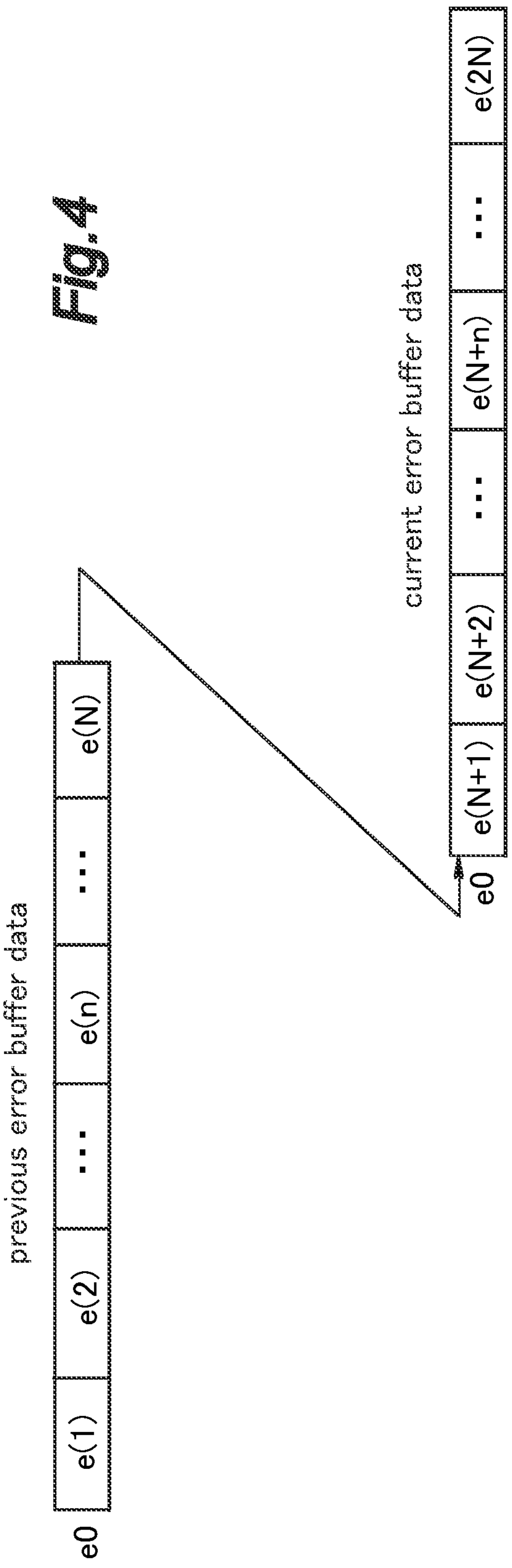
FIG. 4 is an explanatory diagram showing a method of generating connected buffer data according to the first embodiment.

With reference to FIG. 4, for example, the correlation value calculation unit 27 generates the connected buffer data by connecting a current error buffer data e0 and a previous error buffer data e0. In this case, the correlation value calculation unit 27 may temporarily store the previous error buffer data e0 in the memory (storage device 16*b*) of the controller 16, and connect the previous error buffer data e0 and the current error buffer data e0 once the current error buffer data e0 is generated.

Next, the correlation value calculation unit 27 calculates the autocorrelation value Vae of the error buffer data e0 by substituting (entering) the generated first divided data e (t) and second divided data e (t+τ) into the following formula (2). Incidentally, "t1" in the following formula (2) indicates the acquisition time of the first error signal e included in either the first divided data e (t) or the second divided data e (t+τ). Further, "t2" in the following formula (2) indicates the acquisition time of the last error signal e included in either the first divided data e (t) or the second divided data e (t+τ). Further, "Δt" in the following formula (2) indicates the time difference between the time t1 and the time t2.

$$Vae=\frac{1}{\Delta t}\sum_{t=t1}^{t2}e(t)\cdot e(t+\tau) \tag{2}$$

The autocorrelation value Vae becomes smaller when random disturbance is mixed in the error buffer data e0. As will be described later, in the present embodiment, the presence/absence of the disturbance mixed in the error buffer data e0 is detected by using such properties of the autocorrelation value Vae.

<The Disturbance Detection Unit 28>

With reference to FIG. 2, the disturbance detection unit 28 of the controller 16 detects the presence/absence of the disturbance mixed in the error buffer data e0 based on the autocorrelation value Vae output from the correlation value calculation unit 27 and the blower voltage v1 output from the air conditioner 15. The disturbance detection unit 28 outputs the detection result of the presence/absence of the disturbance to the control signal output unit 22. A method of detecting the presence/absence of the disturbance by the disturbance detection unit 28 will be described later.

<The Control Switching Process>

Figure 5:
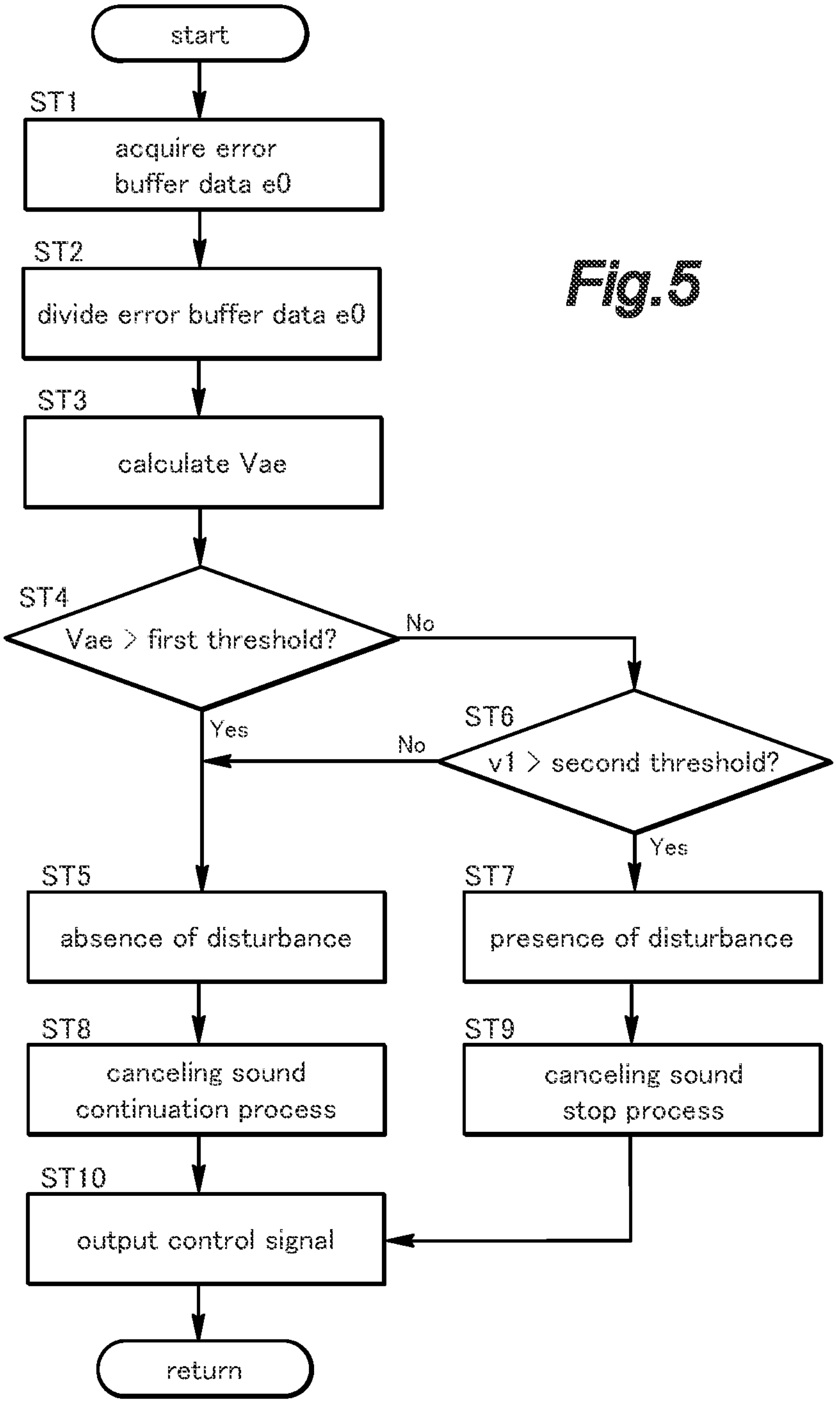
FIG. 5 is a flowchart showing a control switching process according to the first embodiment.

Next, a control switching process executed by the controller 16 will be described with reference to FIG. 5. The control switching process is a process for switching control over each speaker 13.

First, the correlation value calculation unit 27 acquires the error buffer data e0 output from the input buffer unit 26 (step ST1). Next, the correlation value calculation unit 27 generates the first divided data e (t) and the second divided data e (t+τ) by dividing the error buffer data e0 (step ST2). Furthermore, the correlation value calculation unit 27 calculates the autocorrelation value Vae of the error buffer data e0 based on the first divided data e (t) and the second divided data e (t+τ) (step ST3).

Next, the disturbance detection unit 28 determines whether the autocorrelation value Vae of the error buffer data e0 calculated by the correlation value calculation unit 27 is greater than a prescribed first threshold (step ST4). If the autocorrelation value Vae is greater than the first threshold (step ST4: Yes), the disturbance detection unit 28 detects the absence of the disturbance mixed in the error buffer data e0 (step ST5).

On the other hand, if the autocorrelation value Vae is equal to or less than the first threshold (step ST4: No), the disturbance detection unit 28 determines whether the blower voltage v1 output from the air conditioner 15 is greater than a prescribed second threshold (step ST6). If the blower voltage v1 is equal to or less than the second threshold (step ST6: No), the disturbance detection unit 28 detects the absence of the disturbance mixed in the error buffer data e0 (step ST5). On the other hand, if the blower voltage v1 is greater than the second threshold (step ST6: Yes), the disturbance detection unit 28 detects the presence of the disturbance mixed in the error buffer data e0 (step ST7).

If the disturbance mixed in the error buffer data e0 is absent (step ST5), the control signal output unit 22 executes a canceling sound continuation process (step ST8). In the canceling sound continuation process, the control signal output unit 22 generates the control signals u to cause each speaker 13 to continue outputting the canceling sound y. Details of the canceling sound continuation process will be described later.

On the other hand, if the disturbance mixed in the error buffer data e0 is present (step ST7), the control signal output unit 22 executes a canceling sound stop process (step ST9). In the canceling sound stop process, the control signal output unit 22 generates the control signals u to cause each speaker 13 to stop outputting the canceling sound y. At this time, the control signal output unit 22 may cause the speaker 13 to gradually reduce the canceling sound y and then stop outputting the canceling sound y.

Next, the control signal output unit 22 outputs the control signals u generated in the canceling sound continuation process or the canceling sound stop process to the output buffer unit 23 (step ST10). Accordingly, the control switching process ends.

As described above, the control signal output unit 22 executes either the canceling sound continuation process or the canceling sound stop process according to the presence/absence of the disturbance mixed in the error buffer data e0 (steps ST8, ST9). That is, the control signal output unit 22 switches the control over the speaker 13 according to the presence/absence of the disturbance mixed in the error buffer data e0.

<The Canceling Sound Continuation Process>

Figure 6:
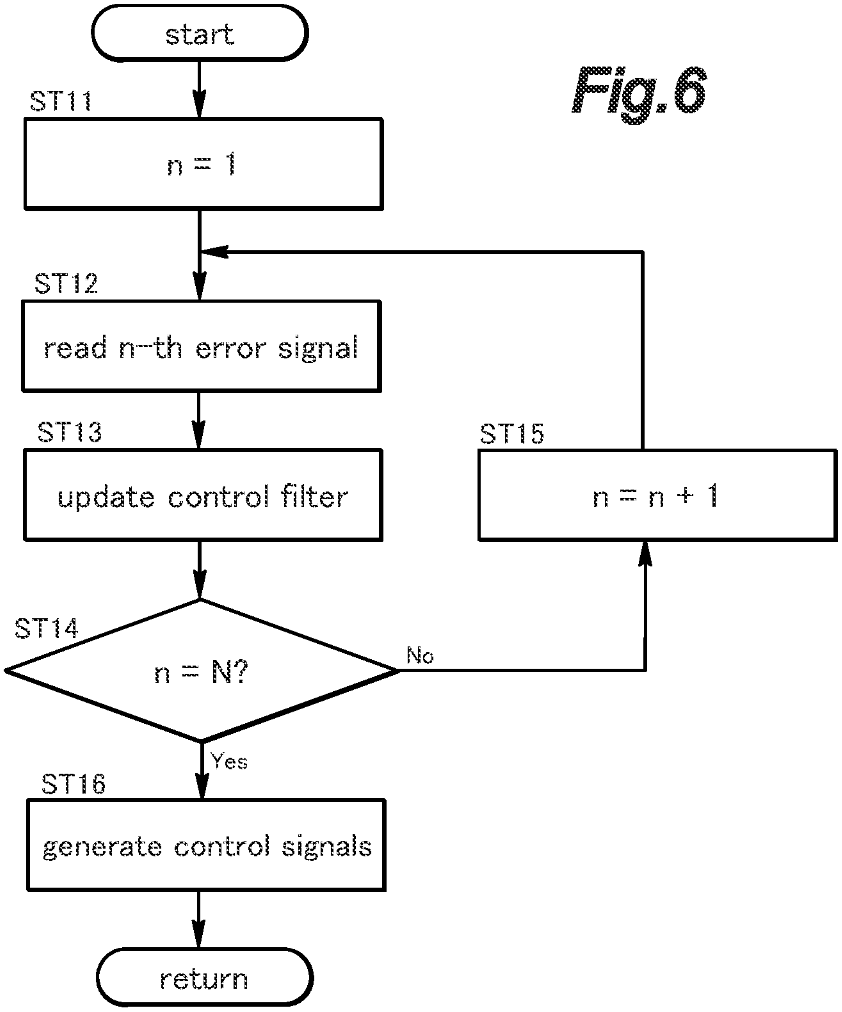
FIG. 6 is a flowchart showing a canceling sound continuation process according to the first embodiment.

Next, the canceling sound continuation process executed by the control signal output unit 22 will be described with reference to FIG. 6.

When the canceling sound continuation process is started, the control signal output unit 22 sets the number n of error signals e to 1 (step ST11). Next, the control signal output unit 22 reads the n-th error signal e included in the error buffer data e0 (step ST12). Next, the control signal output unit 22 adaptively updates the control filter W based on the read n-th error signal e (step ST13).

Next, the control signal output unit 22 determines whether the number n of error signals e has reached N (the total number of error signals e included in the error buffer data e0) (step ST14). If the number n of error signals e has not reached N (step ST14: No), the control signal output unit 22 updates the number n of error signals e to "n+1" (step ST15). After that, the control signal output unit 22 repeats the processing of steps ST12 to ST14.

On the other hand, if the number n of error signals e has reached N (step ST14: Yes), the control signal output unit 22 generates the control signals u based on the control filter W adaptively updated by the N-th error signal e (step ST16).

The Effects of the First Embodiment

As described above, the controller 16 acquires the error buffer data e0 in which the error signals e are stored in a time series, generates the first divided data e (t) and the second divided data e (t+τ) by dividing the error buffer data e0, calculates the autocorrelation value Vae of the error buffer data e0 based on the first divided data e (t) and the second divided data e (t+τ), detects the presence/absence of the disturbance mixed in the error buffer data e0 based on the autocorrelation value Vae of the error buffer data e0, and switches the control over the speaker 13 (the control over the canceling sound y) according to the presence/absence of the disturbance mixed in the error buffer data e0. In other words, the active noise reduction program stored in the storage device 16*b*, when executed by the processing device 16*a*, executes an active noise reduction method described above. Accordingly, the presence/absence of the disturbance mixed in the error buffer data e0 is detected based on the autocorrelation value Vae, and the control over the speaker 13 can be appropriately switched according to the presence/absence of the disturbance. Accordingly, it is possible to suppress the generation of an abnormal sound due to the disturbance.

Further, the controller 16 detects the presence/absence of the disturbance based on both the autocorrelation value Vae and the blower voltage v1. Accordingly, it is possible to improve the detection accuracy of the presence/absence of the disturbance. Accordingly, erroneous detection of the presence/absence of the disturbance due to the change in a driving condition (a state of a road surface or the like) can be suppressed, and the reduction effect of the noise d can be exhibited in more situations.

Further, the air conditioner 15 acquires the blower voltage v1 as the vehicle information, and the controller 16 detects the presence/absence of the disturbance based on the blower voltage v1. Thus, the presence/absence of the disturbance due to the influence of the wind from the air conditioner 15 can be detected with high accuracy.

By the way, in a noise reduction system (not shown) using a dedicated ECU, the signal processing is executed for each signal. On the other hand, in the noise reduction system 11 using the smart device 18 according to the present embodiment, the signal processing is executed for each buffer data including a plurality of signals. Thus, the signal processing differs between the noise reduction system using the dedicated ECU and the noise reduction system 11 using the smart device 18. Accordingly, even if the noise reduction system using the dedicated ECU can detect the disturbance based on the correlation value, the detection method thereof cannot be directly applied to the noise reduction system 11 using the smart device 18.

Further, in the noise reduction system using the dedicated ECU, the cycle of "input, signal processing, and output" is repeated for each signal. Accordingly, the above cycle may be finished for some signals when the period required to calculate the correlation value has elapsed. That is, when the disturbance is detected based on the correlation value, the canceling sounds y may be already output based on some signals. Accordingly, the abnormal sound may be generated before the disturbance is detected.

On the other hand, in the noise reduction system 11 using the smart device 18, the cycle of "input, signal processing, and output" is repeated for each buffer data, and the presence/absence of the disturbance is detected for each buffer data. Accordingly, it is possible to reliably suppress the generation of the abnormal sound before the detection of the disturbance by stopping the output of the canceling sound y based on the buffer data in which the disturbance is mixed.

Figure 7:
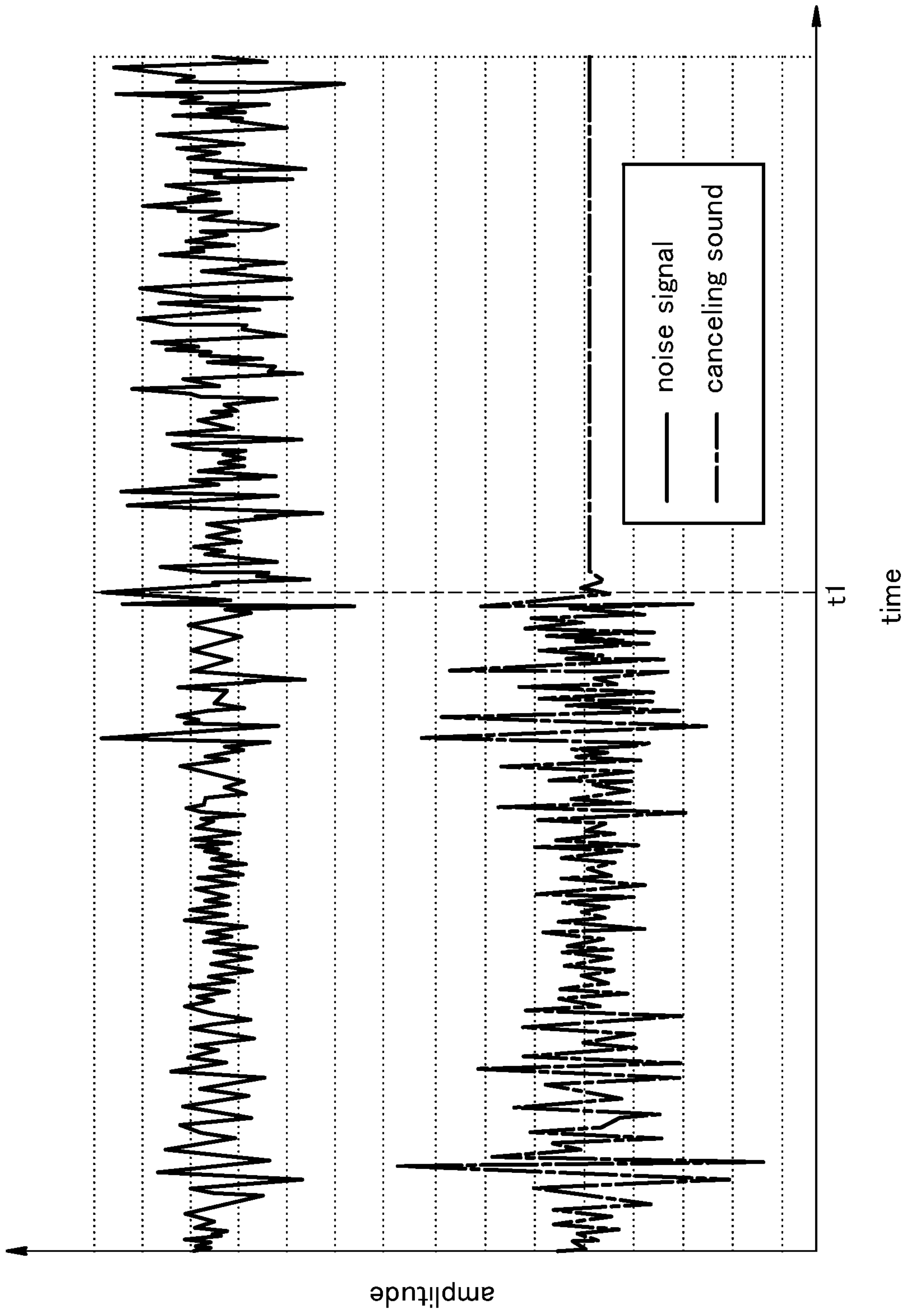
FIG. 7 is a waveform diagram of a noise signal and a canceling sound when disturbance is mixed in error buffer data according to the first embodiment.

FIG. 7 is a waveform diagram of a noise signal (for example, the error signal e or the reference signal x) and the canceling sound y when the disturbance is mixed in the buffer data. As shown in FIG. 7, when the disturbance is mixed in the buffer data at time t1, the controller 16 immediately stops the output of the canceling sound y. Accordingly, it is possible to reliably suppress the generation of the abnormal sound.

The Modification of the First Embodiment

In the above first embodiment, the controller 16 detects the presence/absence of the disturbance based on the autocorrelation value Vae of the error buffer data e0. On the other hand, in the modification of the first embodiment, the controller 16 may detect the presence/absence of the disturbance based on the autocorrelation value Vax (that will be described later) of the reference buffer data x0.

In the above first embodiment, the controller 16 detects the presence/absence of the disturbance based on the autocorrelation value Vae of the error buffer data e0 and the blower voltage v1. On the other hand, in the modification of the first embodiment, the controller 16 may detect the presence/absence of the disturbance based only on the correlation value such as the autocorrelation value Vae of the error buffer data e0.

Figure 8:
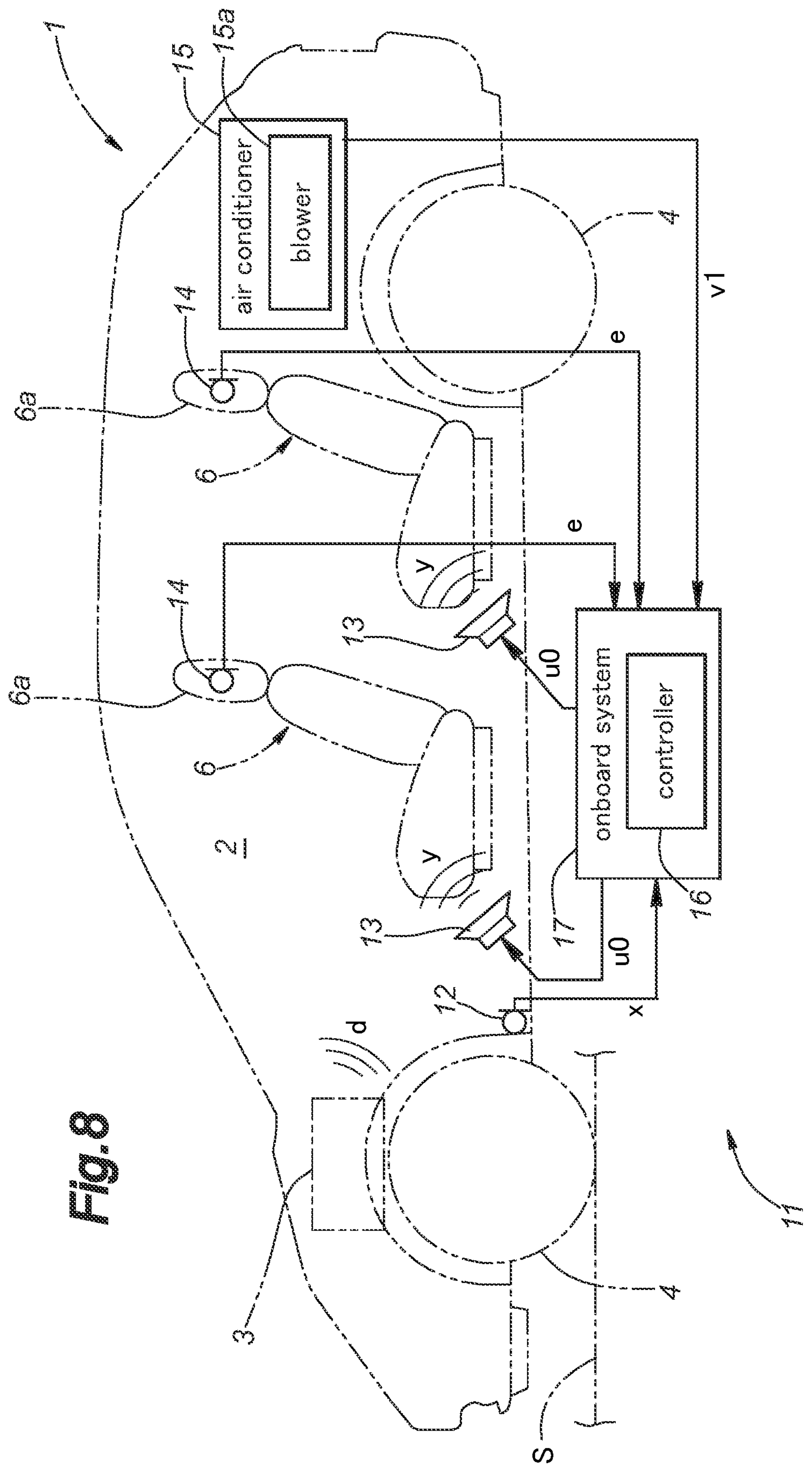
FIG. 8 is a schematic diagram showing a vehicle to which an active noise reduction system according to a modification of the first embodiment is applied.

In the above first embodiment, the controller 16 is provided in the smart device 18 (an example of a portable terminal) configured to be taken outside the vehicle 1. On the other hand, as shown in FIG. 8, in the modification of the first embodiment, the controller 16 may be provided in the onboard system 17 installed in the vehicle 1. More specifically, the controller 16 may be realized by an active noise reduction program (active noise reduction application) executed on an OS of the onboard system 17.

The Second Embodiment

Next, the second embodiment of the present invention will be described with reference to FIGS. 9 and 10. Further, explanations that overlap with those of the first embodiment of the present invention will be omitted as appropriate.

<The Window Opening/Closing Device 37>

Figure 9:
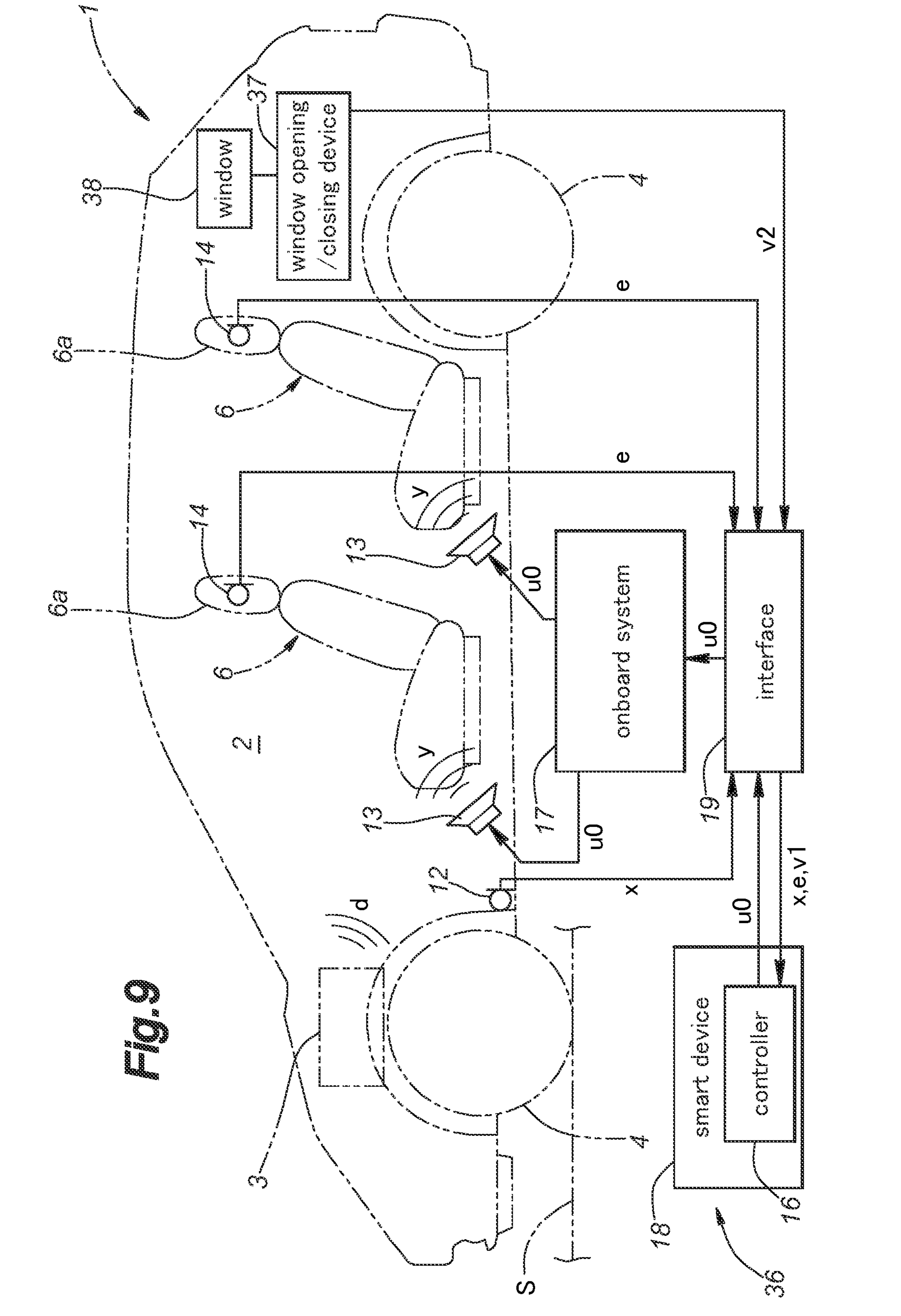
FIG. 9 is a schematic diagram showing a vehicle to which an active noise reduction system according to the second embodiment is applied.
Figure 10:
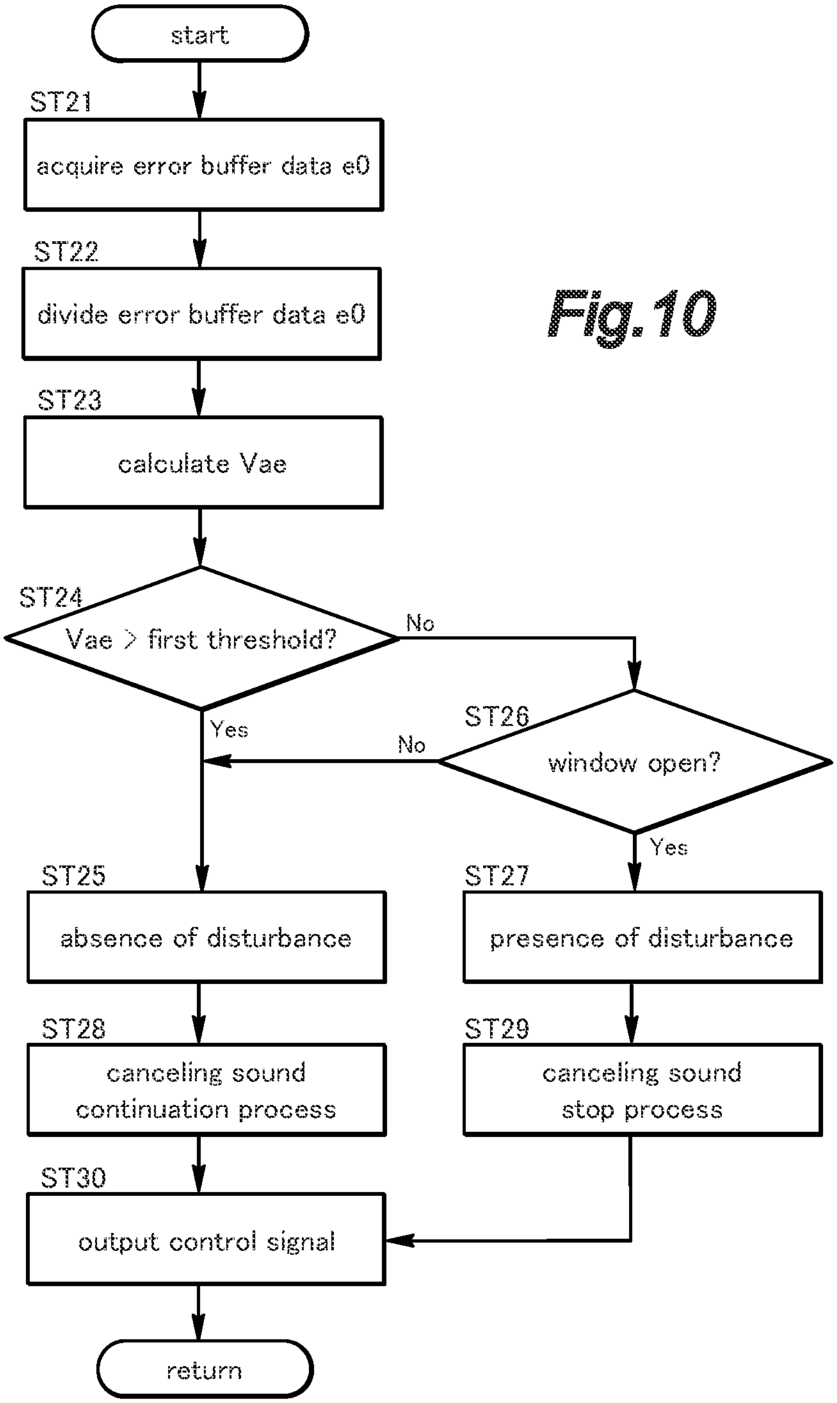
FIG. 10 is a flowchart showing a control switching process according to the second embodiment.

With reference to FIG. 9, an active noise reduction system 36 according to the second embodiment includes a window opening/closing device 37 (an example of a vehicle information acquisition device). The window opening/closing device 37 is a device for opening and closing the window 38 installed in the vehicle 1. The window 38 may be installed on a door of the vehicle 1 or may be installed on a roof (sunroof) of the vehicle 1. The window opening/closing device 37 acquires opening/closing information v2 (an example of vehicle information) of the window 38.

<The Control Switching Process>

Next, a control switching process executed by the controller 16 will be described with reference to FIG. 10. Steps ST21 to ST25 and steps ST27 to ST30 of the control switching process according to the second embodiment are the same as steps ST1 to ST5 and steps ST7 to ST10 of the control switching process according to the first embodiment, respectively. Accordingly, the descriptions of these steps will be omitted.

If the autocorrelation value Vae is equal to or less than the first threshold (step ST24: No), the disturbance detection unit 28 determines whether the window 38 is open based on the opening/closing information v2 of the window 38 output from the window opening/closing device 37 (step ST26). If the window 38 is not open (step ST26: No), the disturbance detection unit 28 detects the absence of the disturbance mixed in the error buffer data e0 (step ST25). On the other hand, if the window 38 is open (step ST26: Yes), the disturbance detection unit 28 detects the presence of the disturbance mixed in the error buffer data e0 (step ST27).

The Effects of the Second Embodiment

As described above, the window opening/closing device 37 acquires the opening/closing information v2 of the window 38 as the vehicle information, and the controller 16 detects the presence/absence of the disturbance based on the opening/closing information v2 of the window 38. Accordingly, it is possible to accurately detect the presence/absence of the disturbance caused by the wind from outside the vehicle.

The Third Embodiment

Next, the third embodiment of the present invention will be described with reference to FIGS. 11 and 12. Further, explanations that overlap with those of the first embodiment of the present invention will be omitted as appropriate.

<The Calculation of the High Frequency Component Vh of the Error Buffer Data e0>

The disturbance detection unit 28 of the controller 16 calculates a high frequency component Vh of the error buffer data e0. Hereinafter, a method of calculating the high frequency component Vh of the error buffer data e0 by the disturbance detection unit 28 will be described in detail.

Figure 11:
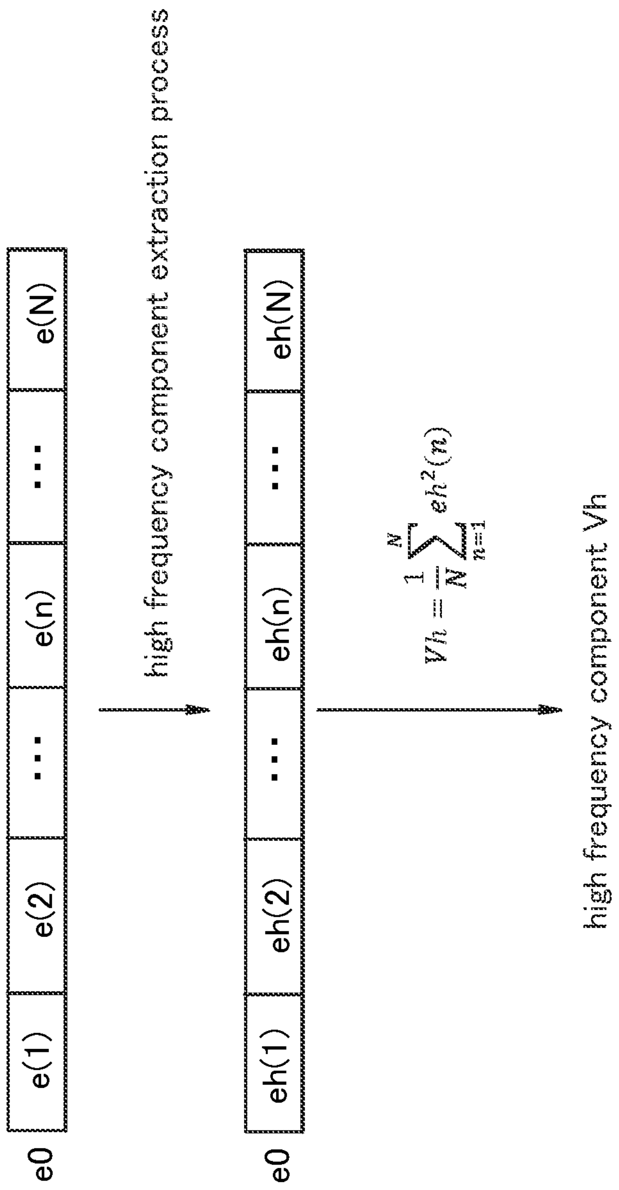
FIG. 11 is an explanatory diagram showing a method of calculating a high frequency component according to the third embodiment.
Figure 12:
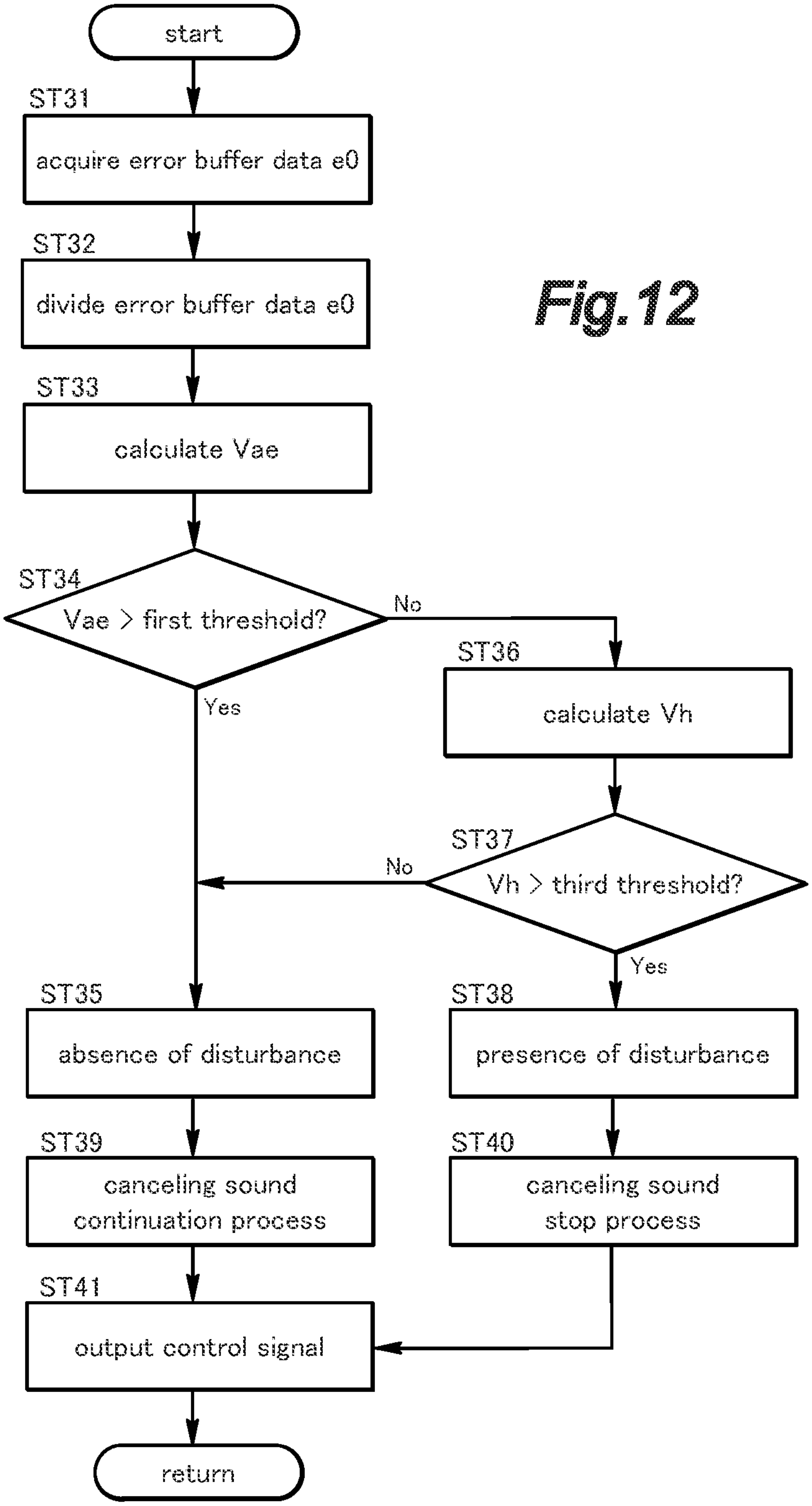
FIG. 12 is a flowchart showing a control switching process according to the third embodiment.

With reference to FIG. 11, the disturbance detection unit 28 converts the error signals e (e (1), e (2), . . . , e (n), . . . , e (N)) into high frequency signals eh (eh (1), eh (2), . . . , eh (n), . . . , eh (N)) by executing a high frequency component extraction process on the error signals e included in the error buffer data e0. The high frequency component extraction process described above is, for example, a high-pass filter process or a second-order differential process.

Next, the disturbance detection unit 28 calculates the high frequency component Vh of the error buffer data e0 by substituting (entering) the high frequency signals eh into the following formula (3).

$$Vh = \frac{1}{N}\sum_{n=1}^{N} eh^2(n) \tag{3}$$

Incidentally, if random disturbance is mixed in the error buffer data e0, the high frequency component Vh of the error buffer data e0 will increase. As will be described later, in the present embodiment, the presence/absence of the disturbance mixed in the error buffer data e0 is detected by using such properties of the high frequency component Vh of the error buffer data e0.

<The Control Switching Process>

Next, the control switching process executed by the controller 16 will be described with reference to FIG. 12. Steps ST31 to ST35 and steps ST38 to ST41 of the control switching process according to the third embodiment are the same as steps ST1 to ST5 and steps ST7 to ST10 of the control switching process according to the first embodiment, respectively. Accordingly, the descriptions of these steps will be omitted.

If the autocorrelation value Vae is equal to or less than the first threshold (step ST34: No), the disturbance detection unit 28 calculates the high frequency component Vh of the error buffer data e0 (step ST36). Next, the disturbance detection unit 28 determines whether the high frequency component Vh is greater than a prescribed third threshold (step ST37). If the high frequency component Vh is equal to or less than the third threshold (step ST37: No), the disturbance detection unit 28 detects the absence of the disturbance mixed in the error buffer data e0 (step ST35). On the other hand, if the high frequency component Vh is greater than the third threshold (step ST37: Yes), the disturbance detection unit 28 detects the presence of the disturbance mixed in the error buffer data e0 (step ST38).

The Effects of the Third Embodiment

As described above, the controller 16 calculates the high frequency component Vh of the error buffer data e0, and detects the presence/absence of the disturbance mixed in the error buffer data e0 based on the autocorrelation value Vae and the high frequency component Vh. Accordingly, it is possible to improve the detection accuracy of the presence/absence of the disturbance even if the vehicle information cannot be acquired.

The Fourth Embodiment

Figure 13:
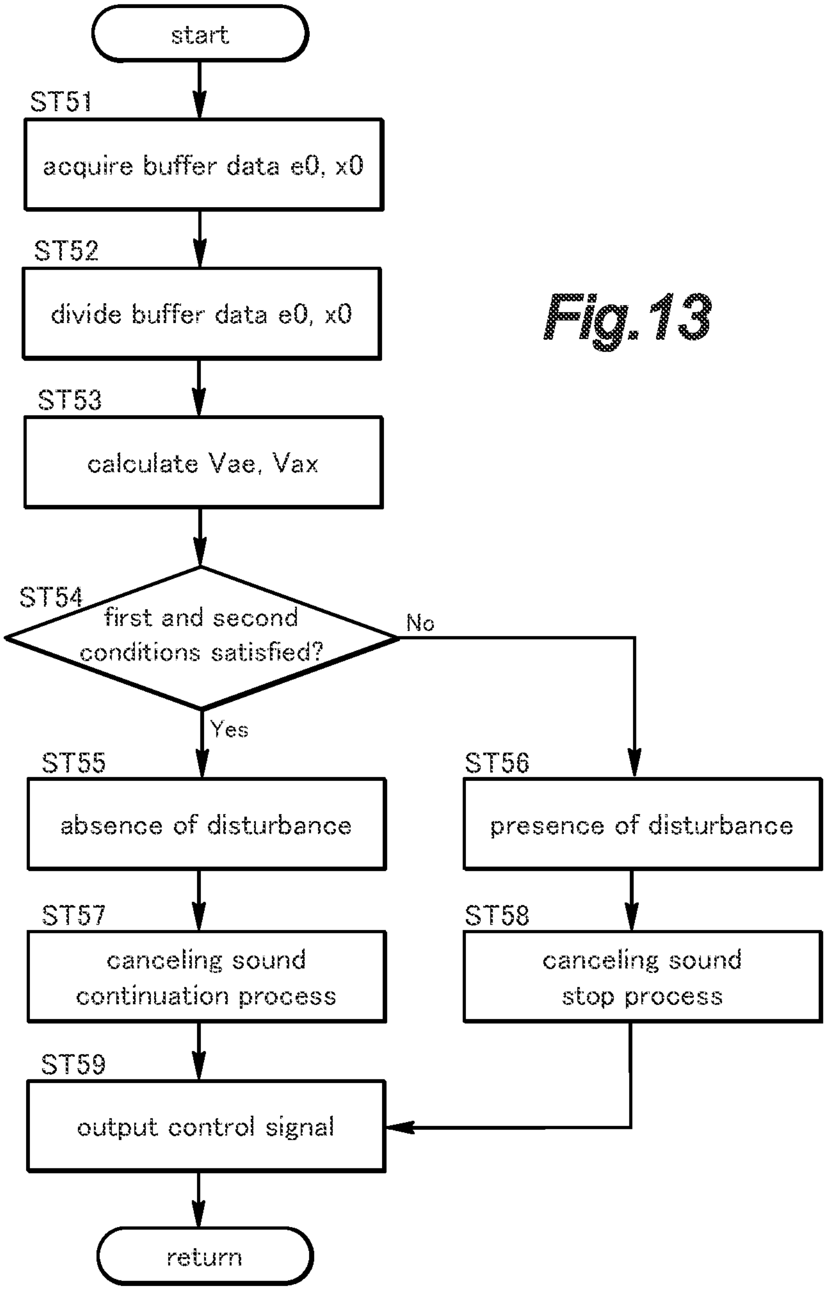
FIG. 13 is a flowchart showing a control switching process according to the fourth embodiment.

Next, with reference to FIG. 13, a control switching process according to the fourth embodiment of the present invention will be described. Steps ST57 to ST59 of the control switching process according to the fourth embodiment are the same as steps ST8 to ST10 of the control switching process according to the first embodiment, respectively. Accordingly, the descriptions of these steps will be omitted.

First, the correlation value calculation unit 27 acquires the error buffer data e0 and the reference buffer data x0 (step ST51). The reference buffer data x0 is the data generated by buffering the reference signals x. In the reference buffer data x0, N (N≥2) pieces of reference signals x (x (1), x (2), . . . , x (n), x (N)) are stored in a time series.

Next, the correlation value calculation unit 27 generates the first divided data e (t) and the second divided data e (t+τ) by dividing the error buffer data e0. Further, the correlation value calculation unit 27 generates the third divided data x (t) and the fourth divided data x (t+τ) by dividing the reference buffer data x0 (step ST52).

Next, the correlation value calculation unit 27 calculates the autocorrelation value Vae of the error buffer data e0 by substituting (entering) the first divided data e (t) and the second divided data e (t+τ) into the above formula (2). The correlation value calculation unit 27 also calculates an autocorrelation value Vax of the reference buffer data x0 by substituting (entering) the third divided data x (t) and the fourth divided data x (t+τ) into the following formula (4) (step ST53).

$$Vax = \frac{1}{\Delta t}\sum_{t=t1}^{t2} x(t)\cdot x(t+\tau) \tag{4}$$

Next, the disturbance detection unit 28 determines whether both the following first condition and the following second condition are satisfied (step ST54).

<The First Condition>

The autocorrelation value Vae of the error buffer data e0 is greater than the first threshold.

<The Second Condition>

The autocorrelation value Vax of the reference buffer data x0 is greater than a prescribed fourth threshold.

If both the first condition and the second condition are satisfied (step ST54: Yes), the disturbance detection unit 28 detects the absence of the disturbance mixed in the error buffer data e0 and the reference buffer data x0 (step ST55). On the other hand, if at least one of the first condition and the second condition is not satisfied, the disturbance detection unit 28 detects the presence of the disturbance mixed in at least one of the error buffer data e0 and the reference buffer data x0 (step ST56).

The Fifth Embodiment

Figure 14:
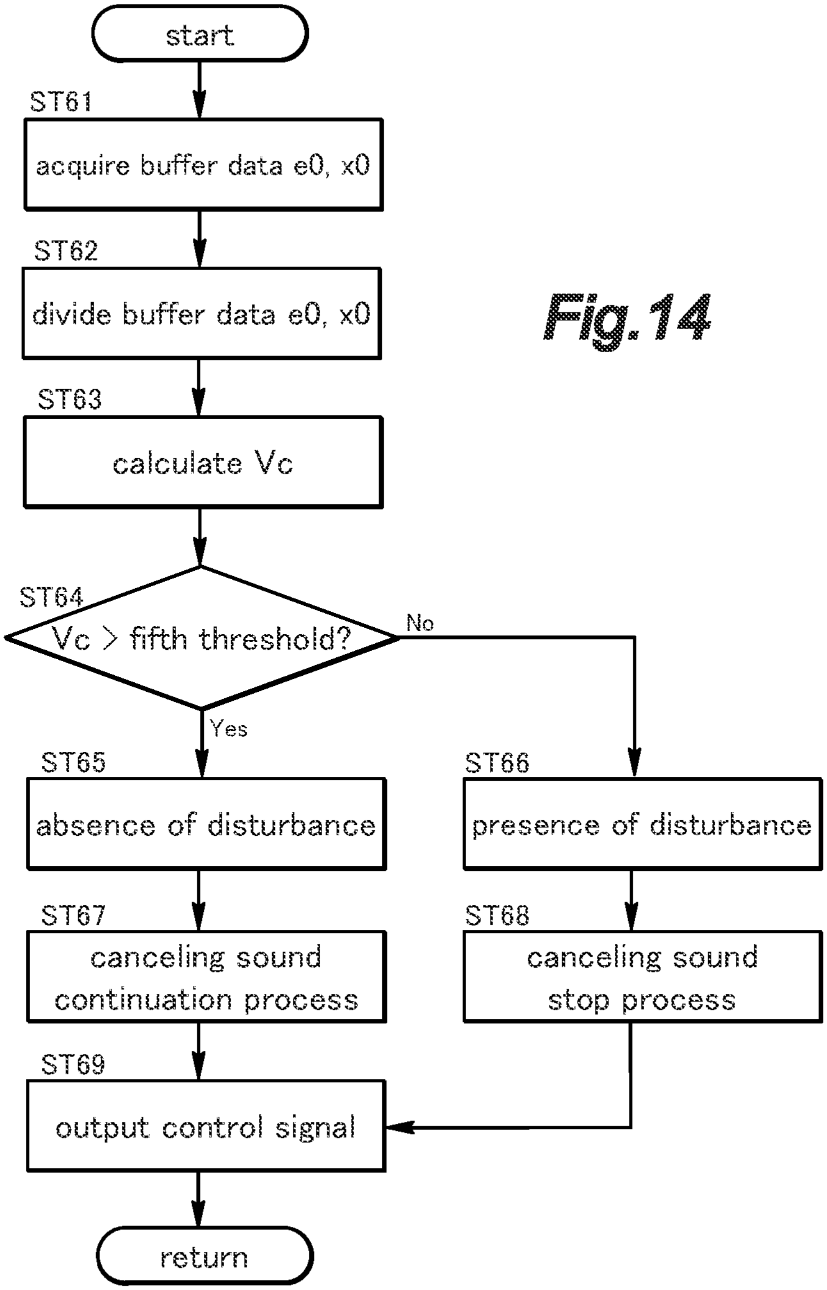
FIG. 14 is a flowchart showing a control switching process according to the fifth embodiment.

Next, with reference to FIG. 14, the control switching process according to the fifth embodiment of the present invention will be described. Steps ST61 to ST62 and steps ST67 to ST69 of the control switching process according to the fifth embodiment are the same as steps ST51 to ST52 and steps ST57 to ST59 of the control switching process according to the fourth embodiment, respectively. Accordingly, the descriptions of these steps will be omitted.

When step ST62 ends, the correlation value calculation unit 27 calculates a cross-correlation value Vc of the error buffer data e0 and the reference buffer data x0 by substituting (entering) the first divided data e (t) and the fourth divided data x (t+τ) into the following formula (5) (step ST63).

$$Vc = \frac{1}{\Delta t}\sum_{t=t1}^{t2} e(t)\cdot x(t+\tau) \tag{5}$$

Next, the disturbance detection unit 28 determines whether the cross-correlation value Vc is greater than a prescribed fifth threshold (step ST64). If the cross-correlation value Vc is greater than the fifth threshold (step ST64: Yes), the disturbance detection unit 28 detects the absence of the disturbance mixed in the error buffer data e0 and the reference buffer data x0 (step ST65). On the other hand, if the cross-correlation value Vc is equal to or less than the fifth threshold, the disturbance detection unit 28 detects the presence of the disturbance mixed in at least one of the error buffer data e0 and the reference buffer data x0 (step ST66).

The Sixth Embodiment

Next, with reference to FIG. 15, the sixth embodiment of the present invention will be described. Further, explanations that overlap with those of the first embodiment of the present invention will be omitted as appropriate. Symbols "ADA" in FIG. 15 indicate "adaptive".

<The Noise Reduction System 41>

Figure 15:
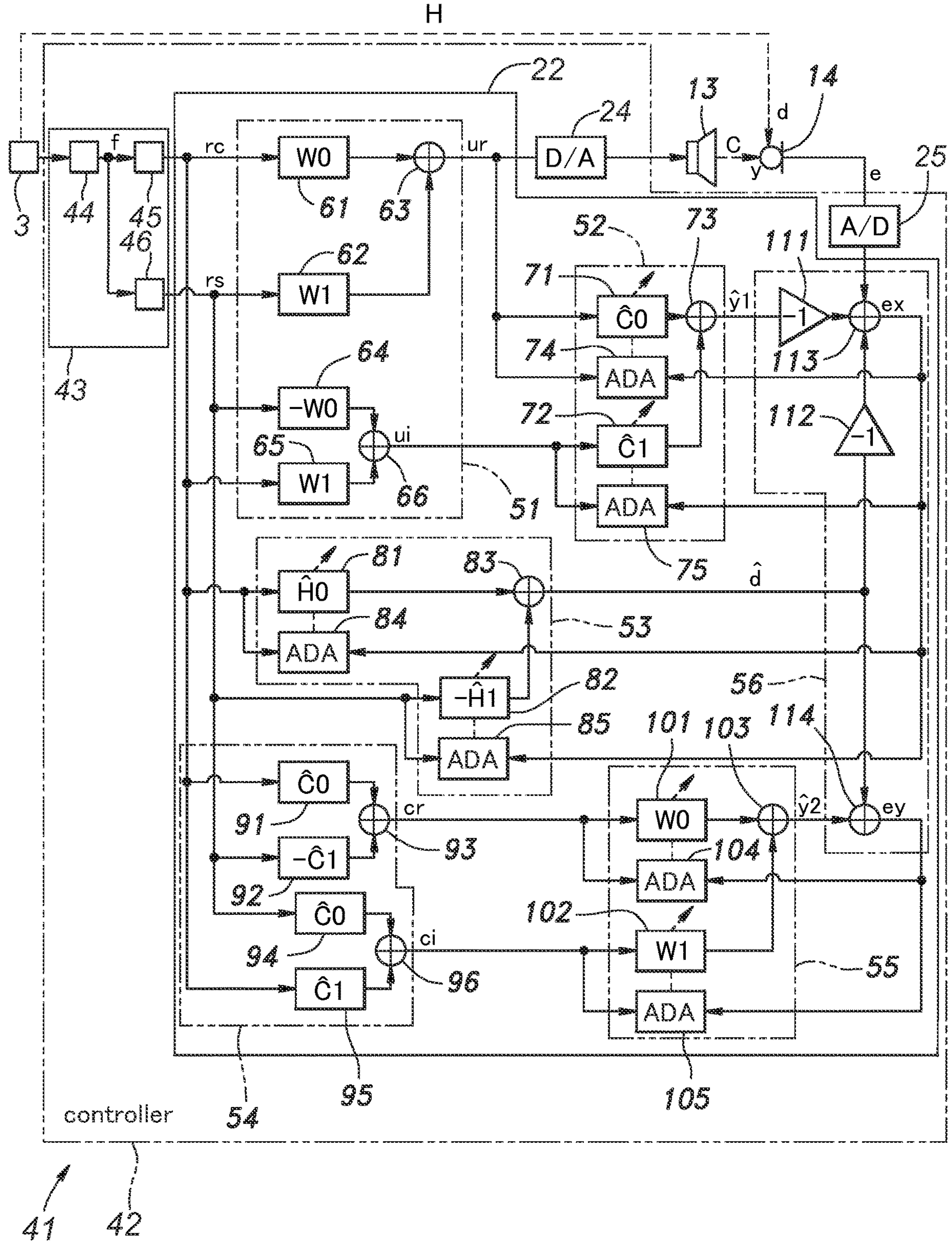
FIG. 15 is a functional block diagram showing an active noise reduction system according to the sixth embodiment.

FIG. 15 is a functional block diagram showing an active noise reduction system 41 (hereinafter abbreviated as "noise reduction system 41") according to the sixth embodiment. In the noise reduction system 41 according to the sixth embodiment, the components other than a controller 42 are the same as those of the noise reduction system 11 according to the first embodiment. Accordingly, the descriptions of these components will be omitted.

<The Controller 42>

The controller 42 of the noise reduction system 41 includes a reference signal generation unit 43 in addition to the components of the controller 16 according to the first embodiment. In FIG. 15, some components of the controller 42 (for example, the output buffer unit 23 and the input buffer unit 26) are omitted.

<The Reference Signal Generation Unit 43>

The reference signal generation unit 43 includes a frequency detection circuit 44, a cosine wave generation circuit 45, and a sine wave generation circuit 46.

The frequency detection circuit 44 detects the frequency of the noise d (hereinafter referred to as "the noise frequency f") based on the vehicle information (for example, the rotating speed of the driving source 3 or the vehicle speed) corresponding to the noise d. The frequency detection circuit 44 outputs the detected noise frequency f to the cosine wave generation circuit 45 and the sine wave generation circuit 46.

The cosine wave generation circuit 45 generates a cosine wave signal rc (an example of the reference signal) corresponding to the noise d based on the noise frequency f output from the frequency detection circuit 44. The cosine wave generation circuit 45 outputs the generated cosine wave signal rc to the control signal output unit 22.

The sine wave generation circuit 46 generates a sine wave signal rs (an example of the reference signal) corresponding to the noise d based on the noise frequency f output from the frequency detection circuit 44. The sine wave generation circuit 46 outputs the generated sine wave signal rs to the control signal output unit 22.

<The Control Signal Output Unit 22>

The control signal output unit 22 of the controller 16 includes a control signal generation unit 51, a canceling estimation signal generation unit 52, a noise estimation signal generation unit 53, a reference signal correction unit 54, a control filter update unit 55, and a virtual error signal generation unit 56.

The control signal generation unit 51 consists of a control filter W. A SAN filter is used for the control filter W. The control signal generation unit 51 includes a first control filter unit 61, a second control filter unit 62, a first adder 63, a third control filter unit 64, a fourth control filter unit 65, and a second adder 66.

The first control filter unit 61 has a control filter coefficient W0. The control filter coefficient W0 forms a real part of the coefficients of the control filter W. The first control filter unit 61 filters the cosine wave signal rc output from the reference signal generation unit 43.

The second control filter unit 62 has a control filter coefficient W1. The control filter coefficient W1 forms an imaginary part of the coefficients of the control filter W. The second control filter unit 62 filters the sine wave signal rs output from the reference signal generation unit 43.

The first adder 63 generates a control signal ur by adding together the cosine wave signal rc that has passed through the first control filter unit 61 and the sine wave signal rs that has passed through the second control filter unit 62. The first adder 63 outputs the generated control signal ur to the D/A conversion unit 24 and the canceling estimation signal generation unit 52.

The third control filter unit 64 has a coefficient acquired by reversing the polarity of the control filter coefficient W0. The third control filter unit 64 filters the sine wave signal rs output from the reference signal generation unit 43.

The fourth control filter unit 65 has the control filter coefficient W1. The fourth control filter unit 65 filters the cosine wave signal rc output from the reference signal generation unit 43.

The second adder 66 generates a control signal ui by adding together the sine wave signal rs that has passed through the third control filter unit 64 and the cosine wave signal rc that has passed through the fourth control filter unit 65. The second adder 66 outputs the generated control signal ui to the canceling estimation signal generation unit 52.

The canceling estimation signal generation unit 52 consists of a secondary path filter C^. The secondary path filter C^ is a filter corresponding to an estimation value of the transfer characteristics C of the canceling sound y from the speaker 13 to the error microphone 14. A SAN filter is used for the secondary path filter C^. The canceling estimation signal generation unit 52 includes a first secondary path filter unit 71, a second secondary path filter unit 72, an adder 73, a first secondary path update unit 74, and a second secondary path update unit 75.

The first secondary path filter unit 71 has a secondary path filter coefficient C^0. The secondary path filter coefficient C^0 forms a real part of the coefficients of the secondary path filter C^. The first secondary path filter unit 71 filters the control signal ur output from the control signal generation unit 51.

The second secondary path filter unit 72 has a secondary path filter coefficient C^1. The secondary path filter coefficient C^1 forms an imaginary part of the coefficients of the secondary path filter C^. The second secondary path filter unit 72 filters the control signal ui output from the control signal generation unit 51.

The adder 73 generates a first canceling estimation signal y^1 by adding together the control signal ur that has passed through the first secondary path filter unit 71 and the control signal ui that has passed through the second secondary path filter unit 72. The first canceling estimation signal y^1 is a signal corresponding to an estimation value of the canceling sound y. The adder 73 outputs the generated first canceling estimation signal y^1 to the virtual error signal generation unit 56.

The first secondary path update unit 74 updates the secondary path filter coefficient C^0 at prescribed sampling cycles using an adaptive algorithm such as the LMS algorithm. More specifically, the first secondary path update unit 74 updates the secondary path filter coefficient C^0 such that the virtual error signal ex (that will be described later) output from the virtual error signal generation unit 56 is minimized.

The second secondary path update unit 75 updates the secondary path filter coefficient C^1 at the above sampling cycles using an adaptive algorithm such as the LMS algorithm. More specifically, the second secondary path update unit 75 updates the secondary path filter coefficient C^1 such that the virtual error signal ex output from the virtual error signal generation unit 56 is minimized.

The noise estimation signal generation unit 53 consists of a primary path filter H^. The primary path filter H^ is a filter corresponding to an estimation value of the transfer characteristics H of the noise d from the noise source (for example, the driving source 3) to the error microphone 14. A SAN filter is used for the primary path filter H^. The noise estimation signal generation unit 53 includes a first primary path filter unit 81, a second primary path filter unit 82, an adder 83, a first primary path update unit 84, and a second primary path update unit 85.

The first primary path filter unit 81 has a primary path filter coefficient H^0. The primary path filter coefficient H^0 forms a real part of the coefficients of the primary path filter H^. The first primary path filter unit 81 filters the cosine wave signal rc output from the reference signal generation unit 43.

The second primary path filter unit 82 has a coefficient acquired by reversing the polarity of a primary path filter coefficient H^1. The primary path filter coefficient H^1 forms an imaginary part of the coefficients of the primary path filter H^. The second primary path filter unit 82 filters the sine wave signal rs output from the reference signal generation unit 43.

The adder 83 generates a noise estimation signal d^ by adding together the cosine wave signal rc that has passed through the first primary path filter unit 81 and the sine wave signal rs that has passed through the second primary path filter unit 82. The noise estimation signal d^ is a signal corresponding to an estimation value of the noise d. The adder 83 outputs the generated noise estimation signal d^ to the virtual error signal generation unit 56.

The first primary path update unit 84 updates the primary path filter coefficient H^0 at the above sampling cycles using an adaptive algorithm such as the LMS algorithm. More specifically, the first primary path update unit 84 updates the primary path filter coefficient H^0 such that the virtual error signal ex output from the virtual error signal generation unit 56 is minimized.

The second primary path update unit 85 updates the primary path filter coefficient H^1 at the above sampling cycles using an adaptive algorithm such as the LMS algorithm. More specifically, the second primary path update unit 85 updates the primary path filter coefficient H^1 such that the virtual error signal ex output from the virtual error signal generation unit 56 is minimized.

The reference signal correction unit 54, like the canceling estimation signal generation unit 52, consists of the secondary path filter CA. When the coefficients (C^0, C^1) of the secondary path filter C^ are updated in the canceling estimation signal generation unit 52, the updated coefficients of the secondary path filter C^ are output to the reference signal correction unit 54, and the coefficients of the secondary path filter C^ are updated in the reference signal correction unit 54. That is, the coefficients of the secondary path filter C^ set in the reference signal correction unit 54 are not fixed values but values that are successively updated based on the signal from the canceling estimation signal generation unit 52.

The reference signal correction unit 54 includes a third secondary path filter unit 91, a fourth secondary path filter unit 92, a first adder 93, a fifth secondary path filter unit 94, a sixth secondary path filter unit 95, and a second adder 96.

The third secondary path filter unit 91 has the secondary path filter coefficient C^0. The third secondary path filter unit 91 filters the cosine wave signal rc output from the reference signal generation unit 43.

The fourth secondary path filter unit 92 has a coefficient acquired by reversing the polarity of the secondary path filter coefficient C^1. The fourth secondary path filter unit 92 filters the sine wave signal rs output from the reference signal generation unit 43.

The first adder 93 generates a reference signal cr by adding together the cosine wave signal rc that has passed through the third secondary path filter unit 91 and the sine wave signal rs that has passed through the fourth secondary path filter unit 92. The first adder 93 outputs the generated reference signal cr to the control filter update unit 55.

The fifth secondary path filter unit 94 has the secondary path filter coefficient C^0. The fifth secondary path filter unit 94 filters the sine wave signal rs output from the reference signal generation unit 43.

The sixth secondary path filter unit 95 has the secondary path filter coefficient C^1. The sixth secondary path filter unit 95 filters the cosine wave signal rc output from the reference signal generation unit 43.

The second adder 96 generates a reference signal ci by adding together the sine wave signal rs that has passed through the fifth secondary path filter unit 94 and the cosine wave signal rc that has passed through the sixth secondary path filter unit 95. The second adder 96 outputs the generated reference signal ci to the control filter update unit 55.

The control filter update unit 55, like the control signal generation unit 51, consists of the control filter W. The control filter update unit 55 includes a fifth control filter unit 101, a sixth control filter unit 102, an adder 103, a first control update unit 104, and a second control update unit 105.

The fifth control filter unit 101 has the control filter coefficient W0. The fifth control filter unit 101 filters the reference signal cr output from the reference signal correction unit 54.

The sixth control filter unit 102 has the control filter coefficient W1. The sixth control filter unit 102 filters the reference signal ci output from the reference signal correction unit 54.

The adder 103 generates a second canceling estimation signal y^2 by adding together the reference signal cr that has passed through the fifth control filter unit 101 and the reference signal ci that has passed through the sixth control filter unit 102. The second canceling estimation signal y^2 is a signal corresponding to an estimation value of the canceling sound y. The adder 103 outputs the generated second canceling estimation signal y^2 to the virtual error signal generation unit 56.

The first control update unit 104 updates the control filter coefficient W0 at the above sampling cycles using an adaptive algorithm such as the LMS algorithm. More specifically, the first control update unit 104 updates the control filter coefficient W0 such that the virtual error signal ey (that will be described later) output from the virtual error signal generation unit 56 is minimized.

The second control update unit 105 updates the control filter coefficient W1 at the above sampling cycles using an adaptive algorithm such as the LMS algorithm. More specifically, the second control update unit 105 updates the control filter coefficient W1 such that the virtual error signal ey output from the virtual error signal generation unit 56 is minimized.

When the coefficients (W0, W1) of the control filter W are updated in the control filter update unit 55, the updated coefficients of the control filter W are output to the control signal generation unit 51, and the coefficients of the control filter W are updated in the control signal generation unit 51. That is, the coefficients of the control filter W set in the control signal generation unit 51 are not fixed values but values that are successively updated based on the signal from the control filter update unit 55.

The virtual error signal generation unit 56 includes a first polarity reversing circuit 111, a second polarity reversing circuit 112, a first adder 113, and a second adder 114.

The first polarity reversing circuit 111 reverses the polarity of the first canceling estimation signal y^1 output from the canceling estimation signal generation unit 52. The second polarity reversing circuit 112 reverses the polarity of the noise estimation signal d^ output from the noise estimation signal generation unit 53.

The first adder 113 generates the virtual error signal ex by adding together the error signal e, the first canceling estimation signal y^1 that has passed through the first polarity reversing circuit 111, and the noise estimation signal d^ that has passed through the second polarity reversing circuit 112. The first adder 113 outputs the generated virtual error signal ex to the canceling estimation signal generation unit 52 and the noise estimation signal generation unit 53.

The second adder 114 generates the virtual error signal ey by adding together the noise estimation signal d^ output from the noise estimation signal generation unit 53 and the second canceling estimation signal y^2 output from the control filter update unit 55. The second adder 114 outputs the generated virtual error signal ey to the control filter update unit 55.

<The Effects>

In the sixth embodiment, the controller 42 uses an adaptive algorithm to update the control filter W, the primary path filter H^, and the secondary path filter C^. Accordingly, the acoustic characteristics in the vehicle cabin 2 can be learned during the execution of the feedback control, and the reduction effect of the noise d can be enhanced.

Concrete embodiments of the present invention have been described in the foregoing, but the present invention should not be limited by the foregoing embodiments and various modifications and alterations are possible within the scope of the present invention.

The invention claimed is:

1. An active noise reduction system, comprising:

a canceling sound output device configured to output a canceling sound for canceling a noise;

a noise signal generator configured to generate noise signals based on the noise; and a controller configured to control the canceling sound output device based on the noise signals, wherein the controller is configured to:

acquire buffer data in which the noise signals are stored in a time series;

generate a plurality of divided data by dividing the buffer data;

calculate a correlation value of the buffer data based on the plurality of divided data;

detect presence/absence of disturbance mixed in the buffer data based on the correlation value; and switch control over the canceling sound output device according to the presence/absence of the disturbance mixed in the buffer data.

2. The active noise reduction system according to claim 1, wherein the canceling sound output device and the noise signal generator are installed in a vehicle, the vehicle includes a vehicle information acquisition device configured to acquire prescribed vehicle information, and the controller is configured to detect the presence/absence of the disturbance mixed in the buffer data based on the correlation value and the vehicle information.

3. The active noise reduction system according to claim 2, wherein the vehicle information acquisition device is an air conditioner configured to condition air inside a vehicle cabin, and the air conditioner includes a blower configured to blow a wind into the vehicle cabin, and is configured to acquire a voltage of the blower as the vehicle information.

4. The active noise reduction system according to claim 2, wherein the vehicle information acquisition device is a window opening/closing device configured to open and close a window of the vehicle, and the window opening/closing device is configured to acquire information on opening/closing of the window as the vehicle information.

5. The active noise reduction system according to claim 1, wherein the controller is configured to calculate a high frequency component of the buffer data and detect the presence/absence of the disturbance mixed in the buffer data based on the correlation value and the high frequency component.

6. The active noise reduction system according to claim 1, wherein upon detecting the absence of the disturbance mixed in the buffer data, the controller causes the canceling sound output device to continue outputting the canceling sound, and upon detecting the presence of the disturbance mixed in the buffer data, the controller causes the canceling sound output device to stop outputting the canceling sound.

7. The active noise reduction system according to claim 1, wherein the canceling sound output device and the noise signal generator are installed in a vehicle, and the controller is installed in a portable terminal configured to be taken outside the vehicle.

8. An active noise reduction method, comprising:

acquiring buffer data in which noise signals generated based on a noise are stored in a time series;

generating a plurality of divided data by dividing the buffer data;

calculating a correlation value of the buffer data based on the plurality of divided data;

detecting presence/absence of disturbance mixed in the buffer data based on the correlation value; and switching control over a canceling sound according to the presence/absence of the disturbance mixed in the buffer data.

9. A non-transitory computer-readable storage medium comprising an active noise reduction program, wherein the active noise reduction program, when executed by a processor, executes an active noise reduction method comprising:

acquiring buffer data in which noise signals generated based on a noise are stored in a time series;

generating a plurality of divided data by dividing the buffer data;

calculating a correlation value of the buffer data based on the plurality of divided data;

detecting presence/absence of disturbance mixed in the buffer data based on the correlation value; and switching control over a canceling sound according to the presence/absence of the disturbance mixed in the buffer data.

* * * * *